United States Patent
Sumiya (10) Patent No.: US 11,145,330 B1
(45) Date of Patent: Oct. 12, 2021

(54) RECORDING TAPE CARTRIDGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/200,923

(22) Filed: Mar. 15, 2021

(30) Foreign Application Priority Data

Mar. 23, 2020 (JP) .............................. JP2020-051709

(51) Int. Cl.
| | |
|---|---|
| *G11B 23/30* | (2006.01) |
| *G11B 5/78* | (2006.01) |
| *G11B 23/04* | (2006.01) |
| *G06K 19/07* | (2006.01) |
| *G06K 19/077* | (2006.01) |
| *G11B 23/107* | (2006.01) |

(52) U.S. Cl.
CPC ............. *G11B 5/78* (2013.01); *G06K 19/07* (2013.01); *G06K 19/077* (2013.01); *G06K 19/07745* (2013.01); *G11B 23/042* (2013.01); *G11B 23/107* (2013.01); *G11B 23/30* (2013.01)

(58) Field of Classification Search
None
See application file for complete search history.

(56) References Cited

U.S. PATENT DOCUMENTS

| | | | | |
|---|---|---|---|---|
| 6,452,745 B1* | 9/2002 | Shiga | ................ | G11B 23/037 360/132 |
| 6,481,658 B1* | 11/2002 | Shiga | ................ | G11B 23/037 242/326.2 |
| 6,820,832 B2* | 11/2004 | Morita | ............... | G11B 23/045 242/348.2 |
| 7,516,913 B2* | 4/2009 | Ashikawa | ........... | G11B 23/042 242/348 |
| 2006/0139804 A1* | 6/2006 | Kitamura | ......... | G11B 23/08714 360/132 |

FOREIGN PATENT DOCUMENTS

JP       H11-238334 A       8/1999

* cited by examiner

*Primary Examiner* — William J Klimowicz
(74) *Attorney, Agent, or Firm* — Solaris Intellectual Property Group, PLLC (57) ABSTRACT

Provided is a recording tape cartridge including: a case that accommodates a reel on which a recording tape is wound and includes a reference surface that serves as a reference in an axial direction of the reel in a case where the case is loaded into a drive device; a noncontact communication medium on which individual information is recorded, the noncontact communication medium being accommodated in the case and having a plate shape; a supporting portion that is formed in the case and supports one surface of the noncontact communication medium except for a lower end portion such that the noncontact communication medium is disposed while being inclined with respect to the reference surface at an angle of approximately 45 degrees; and a groove portion that is formed in the case and accommodates a portion of the lower end portion of the noncontact communication medium. The one surface of the lower end portion of the noncontact communication medium is not in contact with the case.

5 Claims, 9 Drawing Sheets

RECORDING TAPE CARTRIDGE

CROSS-REFERENCE TO RELATED APPLICATIONS

This application claims priority under 35 USC 119 from Japanese Patent Application No. 2020-051709 filed Mar. 23, 2020, the disclosure of which is incorporated by reference herein.

BACKGROUND

1. Technical Field

The present disclosure relates to a recording tape cartridge.

2. Related Art

A recording tape cartridge into which a noncontact communication medium capable of noncontact communication is built is known in the related art (for example, refer to JP1999-238334A (JP-H11-238334A)). In the noncontact communication medium, individual information such as a unique ID, product type identification, use history, production history, and an index of data recorded on a recording tape of the recording tape cartridge are recorded.

SUMMARY

Meanwhile, in a case where the capacity of the recording tape cartridge is made high, the capacity of the noncontact communication medium also needs to be made high. Since the communication distance of an inexpensive noncontact communication medium having a high capacity is short, it is important to secure communication performance with respect to a noncontact reading and writing device provided in a drive device into which the recording tape cartridge is loaded.

Here, it is conceivable to dispose the noncontact communication medium, which is built into the recording tape cartridge, as close as possible to the noncontact reading and writing device in order to secure the communication performance. That is, regarding the recording tape cartridge, there is room for improvement in relation to a structure that optimizes the position of the noncontact communication medium with respect to the noncontact reading and writing device (brings noncontact communication medium as close as possible to noncontact reading and writing device).

Therefore, an object of the present disclosure is to obtain a recording tape cartridge with which it is possible to secure a communication performance even in the case of a noncontact communication medium with a short communication distance.

In order to achieve the object as described above, a recording tape cartridge according to an aspect of the present disclosure comprises: a case that accommodates a reel on which a recording tape is wound and includes a reference surface that serves as a reference in an axial direction of the reel in a case where the case is loaded into a drive device; a noncontact communication medium on which individual information is recorded, the noncontact communication medium being accommodated in the case and having a plate shape; a supporting portion that is formed in the case and supports one surface of the noncontact communication medium except for a lower end portion such that the noncontact communication medium is disposed while being inclined with respect to the reference surface at an angle of approximately 45 degrees; and a groove portion that is formed in the case and accommodates a portion of the lower end portion of the noncontact communication medium. The one surface of the lower end portion of the noncontact communication medium is not in contact with the case.

According to the present disclosure, it is possible to secure a communication performance even in the case of a noncontact communication medium with a short communication distance.

BRIEF DESCRIPTION OF THE DRAWINGS

Exemplary embodiments of the present invention will be described in detail based on the following figures, wherein.

DETAILED DESCRIPTION

Hereinafter, an embodiment according to the present disclosure will be described in detail based on the drawings. For the sake of convenience of description, in FIG. 1, a direction in which a recording tape cartridge 10 is loaded into a drive device is represented by an arrow A and corresponds to a frontward direction (front side) of the recording tape cartridge 10. In addition, a direction along an arrow B orthogonal to the arrow A corresponds to a rightward direction (right side). In addition, a direction orthogonal to the direction along the arrow A and the direction along the arrow B is represented by an arrow C and corresponds to an upward direction (upper side) of the recording tape cartridge 10.

Figure 1:
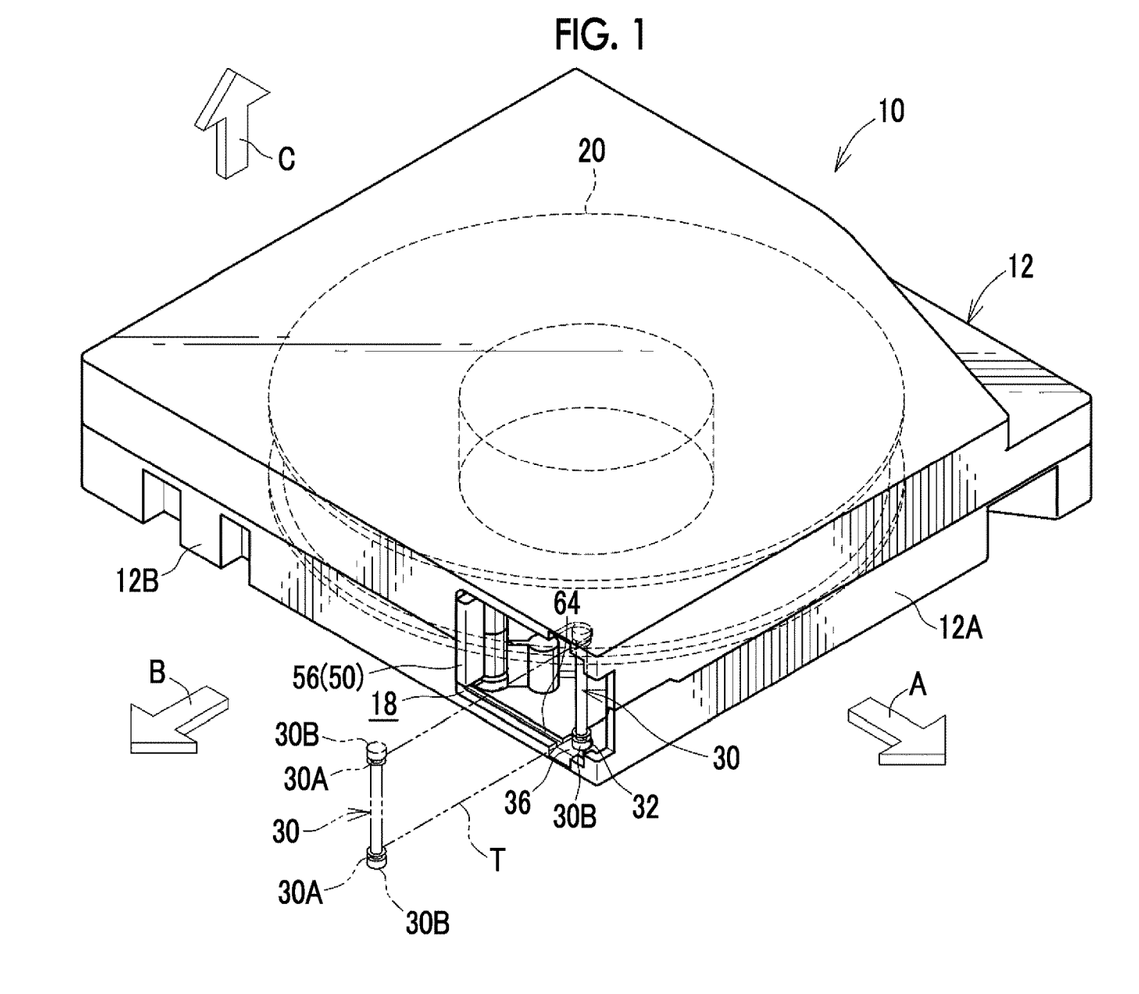
FIG. 1 is a perspective view of a recording tape cartridge according to a present embodiment.
Figure 2:
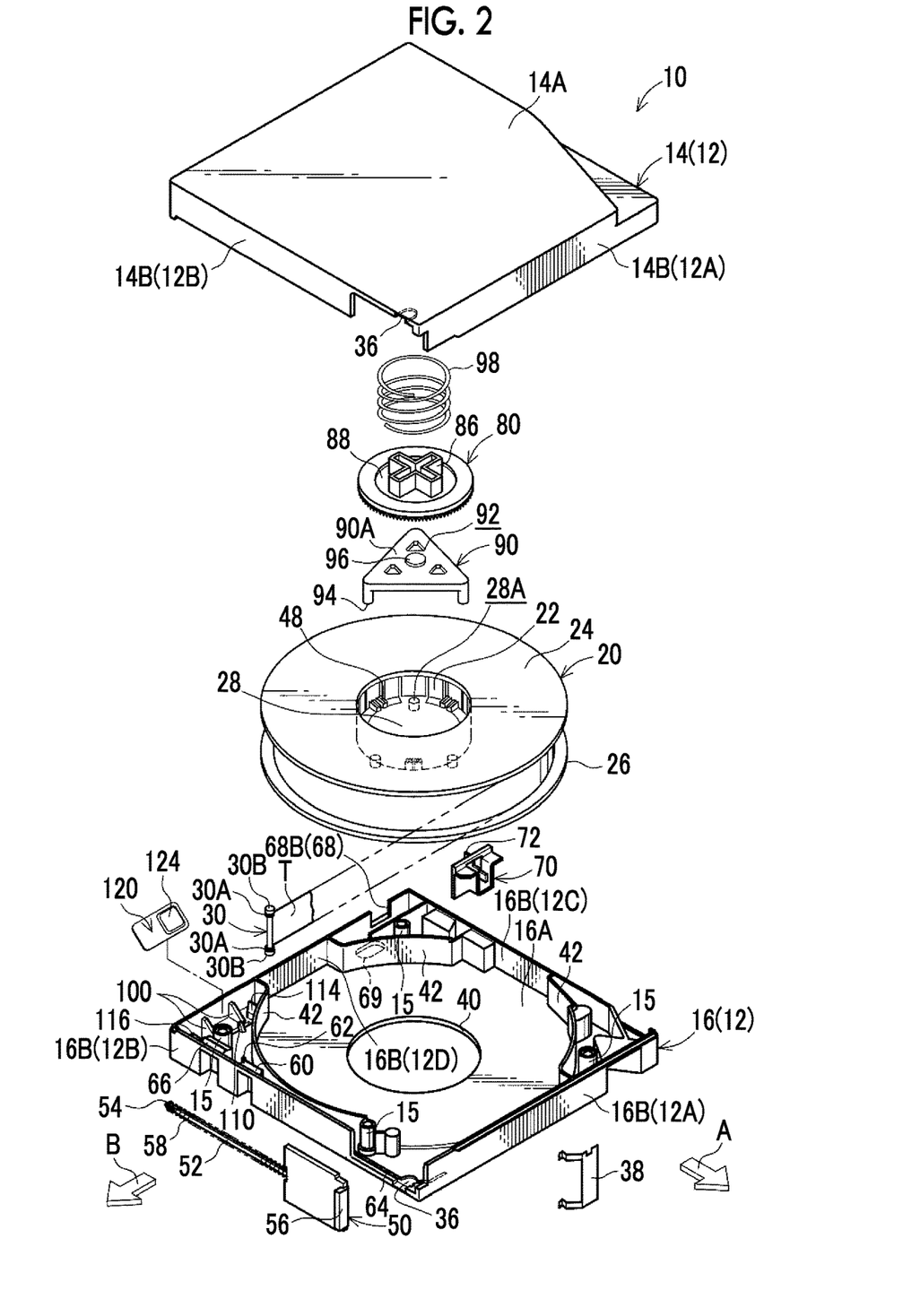
FIG. 2 is an exploded perspective view of the recording tape cartridge according to the present embodiment as seen from above.
Figure 3:
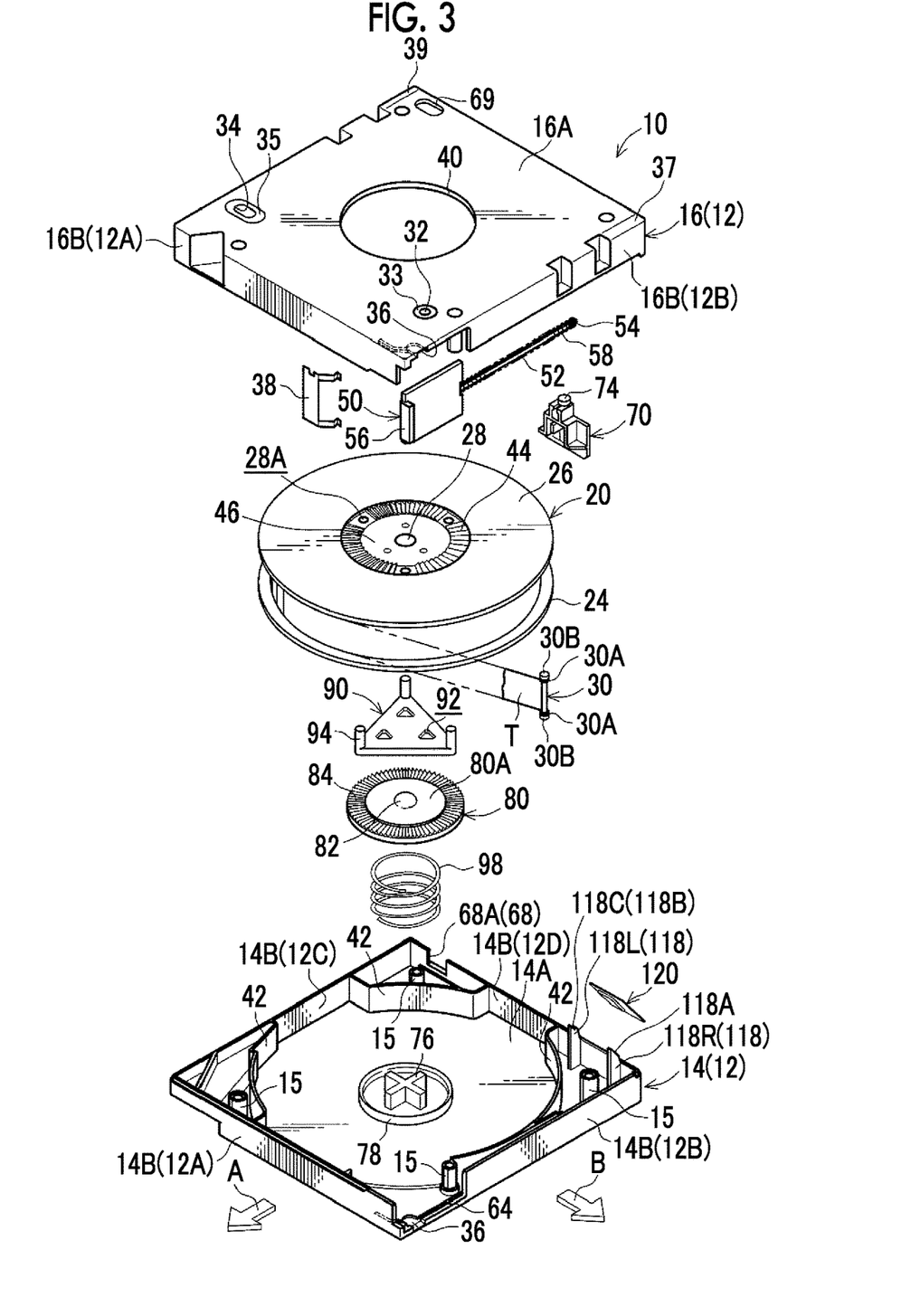
FIG. 3 is an exploded perspective view of the recording tape cartridge according to the present embodiment as seen from below.

As shown in FIGS. 1 to 3, the recording tape cartridge 10 includes a case 12 having an approximately rectangular box shape. The case 12 is configured by bonding an upper case 14 and a lower case 16 through ultrasonic welding, screwing, or the like in a state where a peripheral wall 14B erected on a peripheral edge of a top plate 14A and a peripheral wall 16B erected on a peripheral edge of a bottom plate 16A abut against each other (abutting each other or being close to each other), the upper case 14 and the lower case 16 being made of resin such as polycarbonate (PC).

That is, for example, a screw boss 15 is formed in the vicinity of each corner portion of the upper case 14 and the lower case 16 and the case 12 is assembled with screws (not shown) screwed into the screw bosses 15 from a lower surface side of the lower case 16. In addition, a single reel 20 is rotatably accommodated in the case 12 with a direction along a vertical direction being an axial direction thereof.

The reel 20 is configured by integrally molding a bottomed cylindrical reel hub 22 constituting an axial center portion and a lower flange 26 provided at a lower end portion of the reel hub 22 and welding an upper flange 24 to an upper end portion of the reel hub 22 through ultrasonic welding. In addition, a recording tape T such as a magnetic tape serving as an information recording and reproducing medium is wound on an outer peripheral surface of the reel hub 22, and end portions of the wound recording tape T in a width direction are held by the upper flange 24 and the lower flange 26.

In addition, a reel gear 44 is formed in an annular shape on a lower surface of a bottom wall 28 of the reel hub 22 and a gear opening 40 for exposure of the reel gear 44 to the outside is drilled into a central portion of the lower case 16. With the reel gear 44 exposed through the gear opening 40 and rotationally driven while meshing with a drive gear (not shown) formed on a rotary shaft (not shown) of a drive device (not shown), the reel 20 can rotate relative to the case 12 in the case 12.

In addition, a reel plate 46, which is an annular metal plate made of a magnetic material, is coaxially and integrally fixed to a radially inner side of the reel gear 44 of the lower surface of the bottom wall 28 through insert molding and is adsorbed and held by a magnetic force of an annular magnet (not shown) provided at the rotary shaft of the drive device. Furthermore, the reel 20 is held so as not to wobble by play restricting walls 42 which partially protrude from inner surfaces of the upper case 14 and the lower case 16 and serve as inner walls on a circular trajectory coaxial with the gear opening 40.

In addition, an opening 18 through which the recording tape T wound on the reel 20 is pulled out is formed in a right wall 12B of the case 12. A leader pin 30, which is locked by a pull-out member (not shown) of the drive device and is operated to be pulled out, is fixed to a free end portion of the recording tape T which is pulled out through the opening 18.

Annular grooves 30A are formed on the opposite end portions of the leader pin 30, which protrude further than the end portions of the recording tape T in the width direction, and the annular grooves 30A are locked by a hook or the like of the pull-out member. Accordingly, the hook or the like does not come into contact with the recording tape T and the recording tape T is not damaged in a case where the recording tape T is pulled out.

In addition, in the opening 18 of the case 12, that is, at an inner surface of the top plate 14A of the upper case 14 and an inner surface of the bottom plate 16A of the lower case 16, a pair of upper and lower pin holding portions 36 that positions and holds the leader pin 30 in the case 12 is provided. Each pin holding portion 36 has an approximately semicircular shape of which a side, to which the recording tape T is pulled out, is open and opposite end portions 30B of the leader pin 30 in an upright state can enter and exit the pin holding portions 36 through the open sides.

In addition, a plate spring 38 is fixed and disposed near the pin holding portions 36 and a bifurcating distal end portion of the plate spring 38 engages with the upper and lower opposite end portions 30B of the leader pin 30 such that the leader pin 30 is held at the pin holding portions 36. Note that, in a case where the leader pin 30 enters or exits the pin holding portions 36, the distal end portion of the plate spring 38 is elastically deformed appropriately such that the leader pin 30 is allowed to move.

In addition, the opening 18 is opened and closed by a door 50. The door 50 is formed in an approximately rectangular plate shape that has a size such that the opening 18 can be closed by the door 50 and groove portions 64, into which upper and lower end portions of the door 50 are slidably fitted, are formed in the top plate 14A and the bottom plate 16A inside the opening 18 such that the door 50 can move along the right wall 12B of the case 12.

In addition, a shaft 52 protrudes at the center of a rear end portion of the door 50 and a coil spring 58 is fitted onto the shaft 52. In addition, an expansion portion 54, which prevents the coil spring 58 from falling off, is formed at a rear end of the shaft 52. In addition, a supporting base 60 that includes a locking portion 62 at which a rear end of the coil spring 58 fitted onto the shaft 52 is locked protrudes at the lower case 16.

Accordingly, since the shaft 52 is slidably supported on the supporting base 60 and the rear end of the coil spring 58 is locked at the locking portion 62, the door 50 is urged at all times in a direction, in which the opening 18 is closed, by an urging force of the coil spring 58. Note that, it is preferable that a supporting base 66, which supports the shaft 52 in a case where the opening 18 is opened, is further provided to protrude behind the supporting base 60.

In addition, a projecting portion 56 for an opening and closing operation protrudes outward at a front end portion of the door 50. The projecting portion 56 engages with an opening and closing member (not shown) on the drive device side in a case where the recording tape cartridge 10 is loaded into the drive device. Accordingly, the door 50 is opened against the urging force of the coil spring 58.

In addition, as shown in FIG. 3, a pair of non-through reference holes 32 and 34 is formed in the bottom plate 16A of the lower case 16 at the same position in a front-rear direction, the reference holes 32 and 34 being separated from each other in a lateral direction. The reference hole 32 on the right wall 12B side is formed in an approximately circular shape as seen in a bottom view, and the reference hole 34 on a left wall 12C side is formed in an approximately elliptical shape that is long in the lateral direction as seen in the bottom view.

In addition, in a case where the recording tape cartridge 10 is loaded into the drive device, positioning members (not shown) provided in the drive device are inserted into the reference hole 32 and the reference hole 34, respectively. As a result, the recording tape cartridge 10 (case 12) is positioned in the front-rear direction and the lateral direction in the drive device.

In addition, around the reference hole 32 and the reference hole 34 in the bottom plate 16A, a mirror-finished approximately circular reference surface 33 and a mirror-finished approximately elliptical reference surface 35 are formed. In addition, a reference surface 37 and a reference surface 39, which are mirror-finished and have a rectangular shape (rectangular shape of which the longitudinal direction is parallel to front-rear direction), are also formed at the rear end corners of the bottom plate 16A. Note that, the reference surfaces 33, 35, 37, and 39 are on the same plane.

In a case where the recording tape cartridge 10 is loaded into the drive device, positioning surfaces (not shown) provided in the drive device abut the reference surface 33, the reference surface 35, the reference surface 37, and the reference surface 39, respectively. As a result, a thickness direction of the recording tape cartridge 10 (case 12) (height direction thereof and axial direction of reel 20) is positioned in the drive device.

In addition, as shown in FIGS. 2 and 3, a write protect 70 with which whether or not recording on the recording tape T is allowed is set is provided at a left rear portion of the case 12, the write protect 70 being slidable in the lateral direction. In addition, an opening hole 68, through which an operation projection 72 for manual operation of the write protect 70 protrudes, is formed at a rear wall 12D of the case 12.

The opening hole 68 is formed by a notch portion 68A formed in the peripheral wall 14B of the upper case 14 and a notch portion 68B formed in the peripheral wall 16B of the lower case 16 in a case where the upper case 14 and the lower case 16 are bonded to each other. Further, an elongated hole 69 through which a protrusion portion 74 of the write protect 70 is exposed is drilled into the lower case 16 with the longitudinal direction thereof being parallel to the lateral direction.

In a case where the recording tape cartridge 10 is loaded into the drive device, the position of the write protect 70 is detected on the drive device side such that whether or not recording on the recording tape T is allowed is automatically determined. Note that, the protrusion portion 74 of the write protect 70 does not protrude from a lower surface of the lower case 16.

In addition, a plurality of engaging gears 48 are erected on a peripheral edge of an upper surface of the bottom wall 28 of the reel hub 22 at predetermined gaps (at equal intervals) (for example, three engaging gears are erected at 120-degree intervals) and a plurality of through-holes 28A are drilled into predetermined positions above the reel gear 44 between the engaging gears 48 (in this case, three through-holes are drilled at 120-degree intervals). In addition, a disc-shaped braking member 80 molded of a resin material is provided inside the reel hub 22.

A braking gear 84 that can mesh with the engaging gear 48 is formed in an annular shape on a peripheral edge of a lower surface 80A of the braking member 80. On an upper surface of the braking member 80, an engaging projection 86 into which a rotation restricting rib 76 is inserted and which has an approximately cross shape as seen in a plan view is erected such that the height thereof is slightly higher than the height of the rotation restricting rib 76, the rotation restricting rib 76 protruding downward from the inner surface of the top plate 14A of the upper case 14 and having an approximately cross shape as seen in the plan view. Accordingly, the braking member 80 cannot rotate with respect to the case 12 (upper case 14) and is movable in the vertical direction (axial direction of reel 20) in the reel hub 22.

In addition, a compression coil spring 98 is provided between the upper case 14 and the braking member 80. That is, the compression coil spring 98 is provided in a state where one end thereof abuts the inside of an annular projection 78 (between rotation restricting rib 76 and annular projection 78) protrudes outside the rotation restricting rib 76 of the upper case 14 and the other end abuts the inside of an annular groove 88 provided on the upper surface of the braking member 80. The braking member 80 is urged downward by the urging force of the compression coil spring 98 at all times.

Therefore, in a case where the recording tape cartridge 10 is not in use (where recording tape cartridge is not loaded in drive device), the braking gear 84 is in a state of meshing with the engaging gear 48 at all times and the reel 20 is in a rotation-locked state where the relative rotation of the reel 20 with respect to the case 12 is prevented. Note that, at this time, the reel 20 is pressed against the lower case 16 by the urging force and the reel gear 44 is exposed through the gear opening 40.

In addition, inside the reel hub 22, a releasing member 90 that is molded of a resin material and has an approximately regular triangular shape as seen in the plan view is provided below the braking member 80 (between bottom wall 28 and braking member 80). A plurality of through-holes 92 having a predetermined shape are drilled into the releasing member 90 at appropriate positions (three hexagonal through-holes are drilled in drawing) to reduce the weight of the releasing member 90. In addition, at vertex portions on a lower surface of the releasing member 90, leg portions 94, which are inserted into the through-holes 28A and protrude from the lower surface of the bottom wall 28 over the reel gear 44 by a predetermined height, are provided to protrude.

In addition, a flat supporting projecting portion 96 is formed on the center of an upper surface 90A of the releasing member 90 and an approximately hemispherical releasing projection 82 protruding from the center of the lower surface 80A of the braking member 80 abuts the supporting projecting portion 96 (refer to FIGS. 2 and 3). Accordingly, the area of contact between the braking member 80 and the releasing member 90 is decreased and thus there is a decrease in sliding resistance in the case of use (rotation of reel 20). Note that, as the material of the braking member 80, for example, polyacetal (POM) is used and as the material of the releasing member 90, for example, polybutylene terephthalate (PBT) is used.

Figure 5:
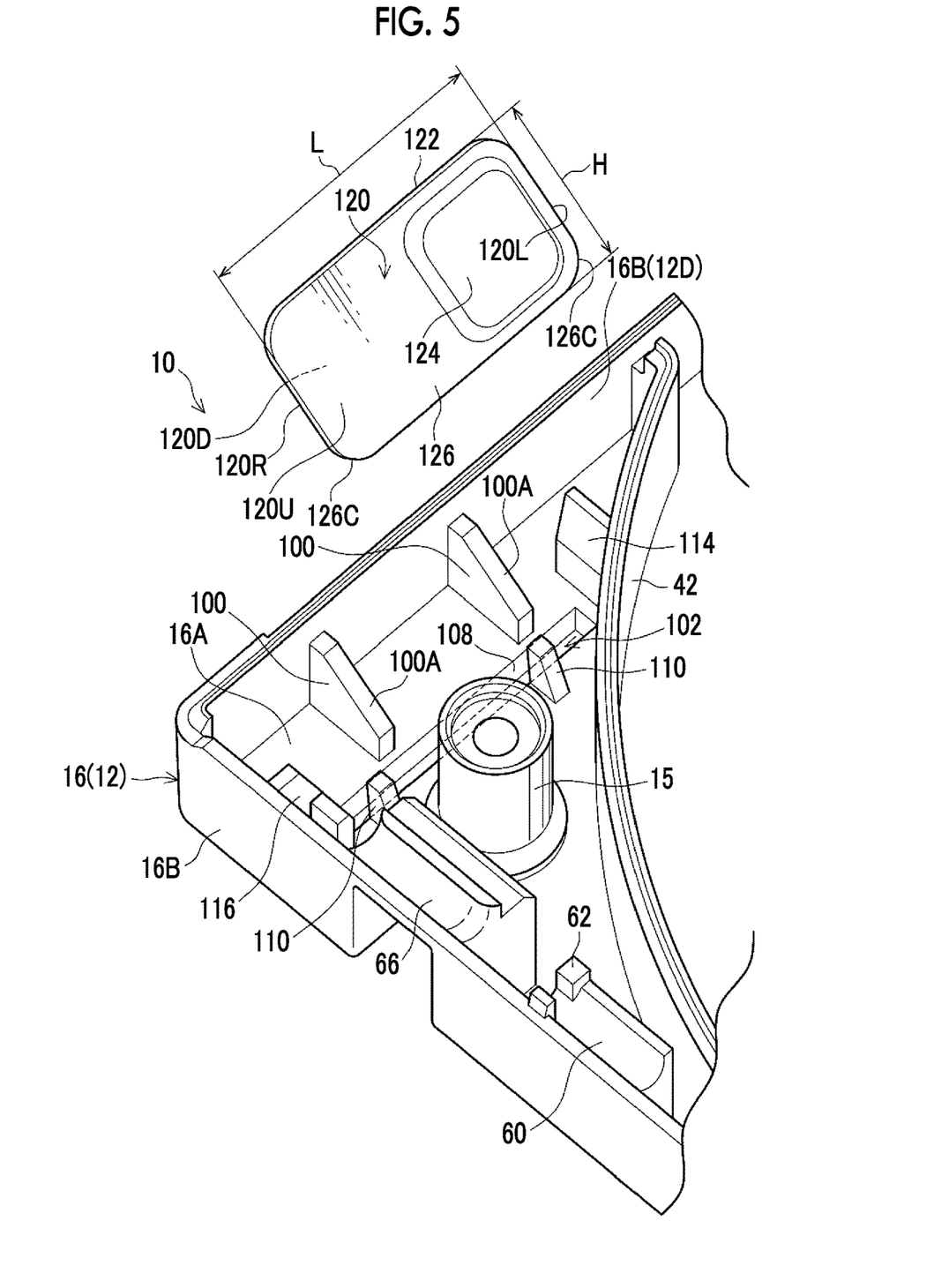
FIG. 5 is a perspective view showing a state before a cartridge memory built into the recording tape cartridge according to the present embodiment is supported by supporting ribs.
Figure 6:
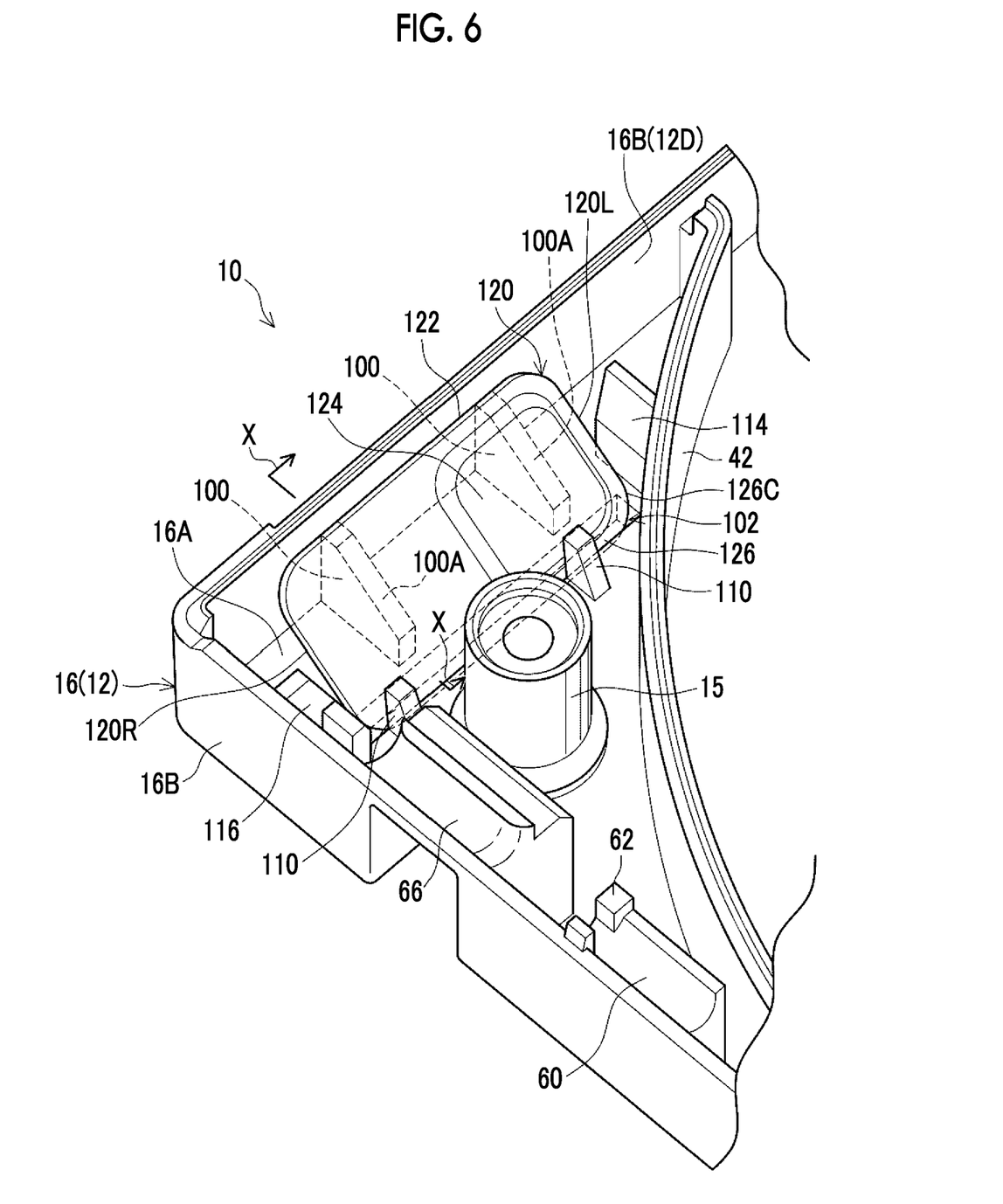
FIG. 6 is a perspective view showing a state after the cartridge memory built into the recording tape cartridge according to the present embodiment is supported by the supporting ribs.
Figure 7:
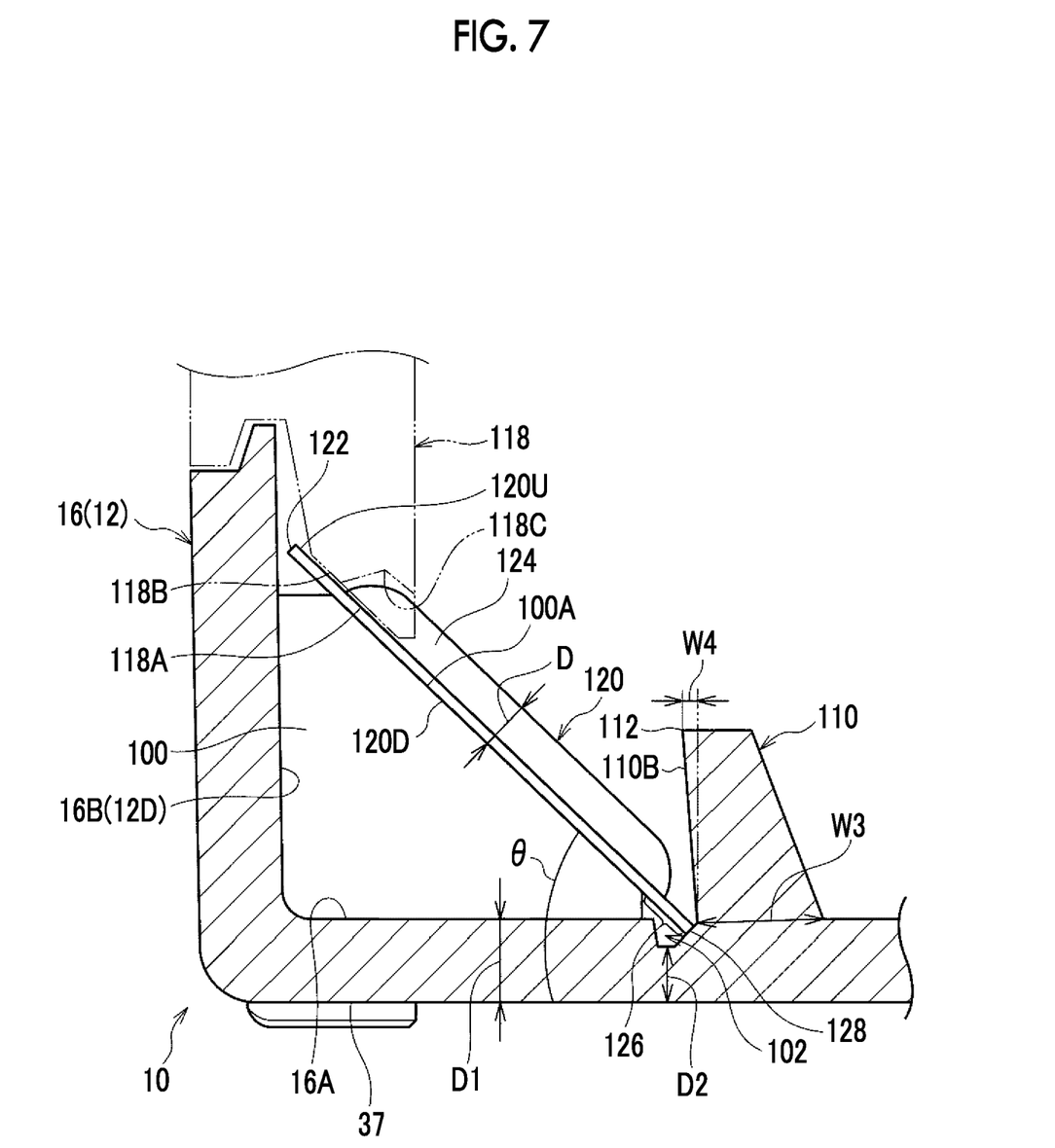
FIG. 7 is a sectional view taken along line X-X in FIG. 6 as seen in the arrow direction.

In addition, as shown in FIGS. 2, 3 and 5 to 7, at a right rear portion of the case 12 (lower case 16), a cartridge memory 120 as a noncontact communication medium is disposed while being inclined with respect to the reference surfaces 33, 35, 37, and 39 at a predetermined angle θ (refer to FIG. 7). The cartridge memory 120 is formed in an approximately rectangular flat plate shape (approximately rectangular shape as seen in plan view) of which the longitudinal direction is parallel to the lateral direction and the size thereof is defined by a standard.

Specifically, for example, L=20 mm, H=10 mm, and D=1 mm, where the length of the cartridge memory 120 in the lateral direction is L, the length (height) thereof in the vertical direction is H, and the thickness thereof including the thickness of a swollen portion 124 which will be described later is D. Note that, the thickness of an epoxy substrate 122, which will be described later, is 0.1 mm, for example. In addition, the cartridge memory 120 has an extremely light weight of about several g.

In addition, on a lower surface 120D, which is one surface of the cartridge memory 120, a coil-shaped antenna (not shown) that receives a magnetic field emitted from a noncontact reading and writing device (not shown) provided in the drive device is provided. In addition, the swollen portion 124 in which an IC chip (not shown) is sealed and which has an approximately square shape as seen in the plan view is provided on an end portion side on an upper surface 120U in a longitudinal direction, the upper surface 120U being the other surface of the cartridge memory 120.

More specifically, the cartridge memory 120 is composed of the epoxy substrate 122, the IC chip provided on an upper surface of the epoxy substrate 122, a metal wire (antenna) that is electrically connected to the IC chip and is provided in a coil shape on a lower surface of the epoxy substrate 122, and the swollen portion 124 that is provided on the upper surface of the epoxy substrate 122, protects the IC chip sealed therein, and is made of ultraviolet curable resin.

Individual information is recorded on the IC chip. Specifically, individual information such as a unique ID, recording capacity, recording format, product type identification, use history, production history, and an index of data recorded on the recording tape T of the recording tape cartridge 10 are recorded on the IC chip. In addition, the IC chip is a so-called microcomputer type IC chip which is low in manufacturing cost and of which the communication distance is relatively short (power consumption is relatively large). However, the capacity thereof is, for example, 4 KB, 8 KB, or 16 KB, which is high.

In addition, as shown in FIGS. 2 and 4 to 7, two (one pair of) supporting ribs 100 as supporting portions, on which the cartridge memory 120 is disposed while being inclined at the predetermined angle θ (θ=approximately 45 degrees (specifically θ=45 degrees±5 degrees, preferably θ=45 degrees±2 degrees)), are integrally provided with inner surfaces of the bottom plate 16A and the peripheral wall 16B (rear wall 12D) of the lower case 16 behind the screw boss 15 on the right rear side and the supporting base 66 as seen in a side view such that the supporting ribs 100 protrude at a predetermined interval in the lateral direction.

As shown in FIG. 7, the supporting ribs 100 are formed in an approximately right angled triangular shape as seen in the side view and upper surfaces thereof inclined with respect to the reference surfaces 33, 35, 37, and 39 (refer to FIG. 3) of the lower case 16 at the predetermined angle θ are supporting surfaces 100A that support the lower surface 120D of the cartridge memory 120 except for a lower end portion 126. Therefore, the lower end portion 126 of the cartridge memory 120 refers to a region on a lower side where the supporting surfaces 100A of the supporting ribs 100 are not in contact with the cartridge memory 120 as seen in the side view.

In addition, as shown in FIGS. 4 to 8, on the inner surface of the bottom plate 16A of the lower case 16, a groove portion 102 that accommodates a portion 126A of the lower end portion 126 of the cartridge memory 120 (which is below virtual extension line K1 (refer to FIG. 8) extending forward along inner surface of bottom plate 16A) is formed. The groove portion 102 is formed in an approximately trapezoidal shape and includes an inclined surface 104 that a lower end surface 128 of the cartridge memory 120 abuts, a bottom surface 106 that continues from a lower edge portion 104D of the inclined surface 104 and extends rearward, and a vertical wall surface 108 that continues from a rear edge portion 106B of the bottom surface 106 and extends upward.

In addition, a lower surface 126D of the lower end portion 126 of the cartridge memory 120 is not in contact with an upper edge portion 108U (planar portion 16C which will be described later) of the vertical wall surface 108. In other words, a predetermined gap (length W1 (refer to FIG. 8) thereof in direction along inner surface of bottom plate 16A is about 0.5 mm) is formed between the lower surface 126D and the upper edge portion 108U.

Note that, a fact that the lower surface 126D of the lower end portion 126 of the cartridge memory 120 is not in contact with the upper edge portion 108U of the vertical wall surface 108 formed on the bottom plate 16A also means that a virtual extension line K2 (refer to FIG. 8) extending along the supporting surface 100A of the supporting rib 100 extends through a position separated from the upper edge portion 108U while intersecting the virtual extension line K1 (is positioned above upper edge portion 108U).

In addition, as shown in FIG. 6, the length of the groove portion 102 in the lateral direction is equal to or larger than the length L of the cartridge memory 120 in the lateral direction. However, it is preferable that the groove portion 102 is formed as short as possible in the viewpoint of preventing a decrease in strength of the lower case 16. Therefore, for example, the groove portion 102 may be formed to have a length such that upper portions of arc-shaped corner portions 126C (refer to FIG. 5) formed on both the right and left sides of the lower end portion 126 of the cartridge memory 120 cannot enter the groove portion 102.

Figure 8:
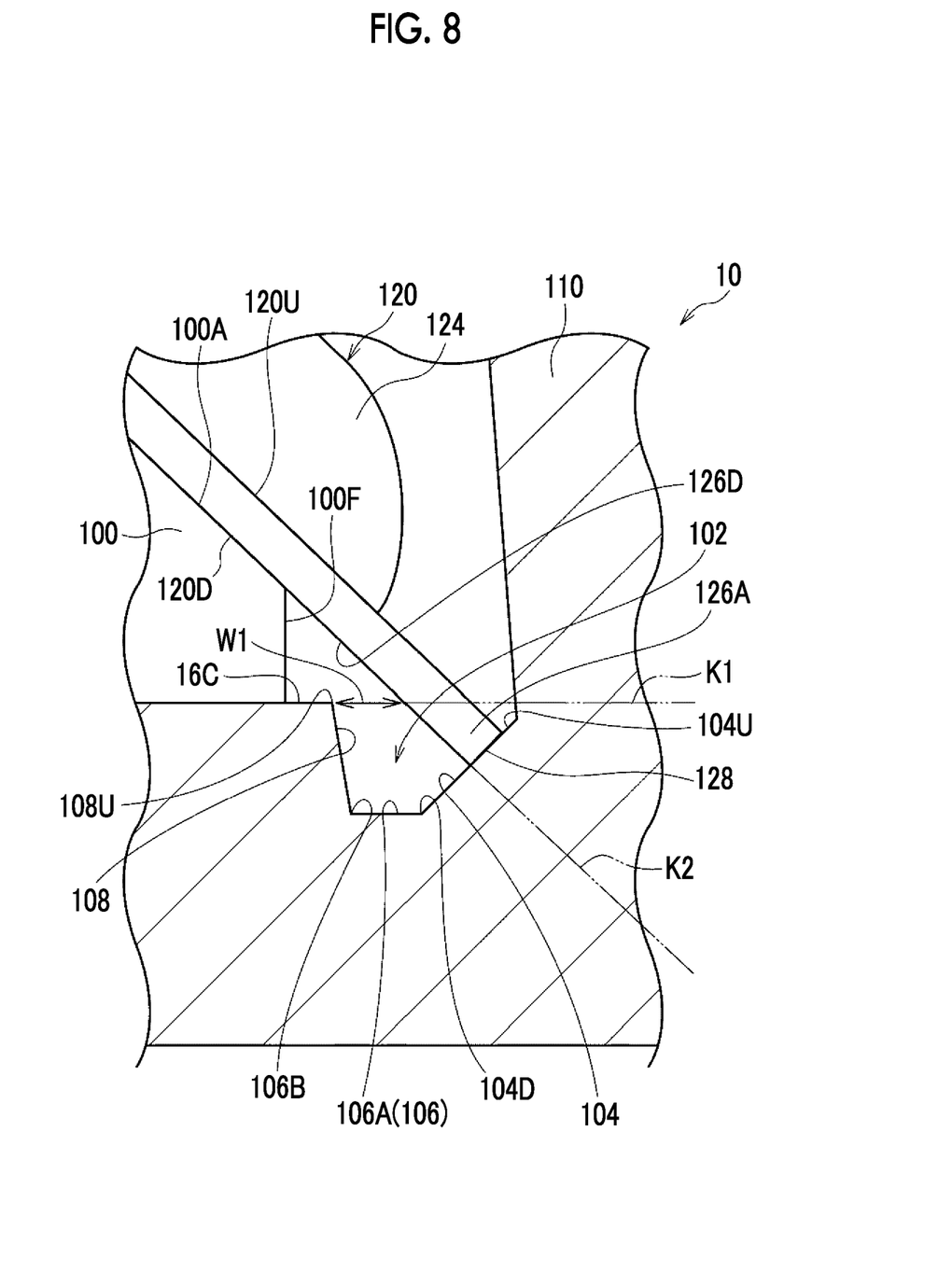
FIG. 8 is a sectional view showing a portion of FIG. 7 in an enlarged manner.

In addition, as shown in FIG. 8, front end portions 100F of the supporting ribs 100 are positioned behind the upper edge portion 108U of the vertical wall surface 108. In other words, the planar portion 16C as a portion of the inner surface of the bottom plate 16A is formed ahead of the front end portions 100F of the supporting ribs 100. According to such a configuration, it is easy to obtain processing accuracy with respect to a portion of a mold for formation of the groove portion 102.

In addition, since the portion 126A of the lower end portion 126 of the cartridge memory 120 is accommodated into the groove portion 102, the cartridge memory 120 is disposed while being lowered by a predetermined depth in comparison with a case where the lower end portion 126 is supported by the inner surface of the bottom plate 16A. Specifically, for example, in a case where a thickness D1 of the bottom plate 16A (refer to FIG. 7) is 1.5 mm, a thickness D2 (refer to FIG. 7) between a lower surface of the bottom plate 16A and the bottom surface 106 of the groove portion 102 is 1.1 mm. Therefore, the depth of the groove portion 102 is 0.4 mm at most and the cartridge memory 120 is disposed while being slightly lowered by a depth smaller than the maximum depth of the groove portion.

Figure 4:
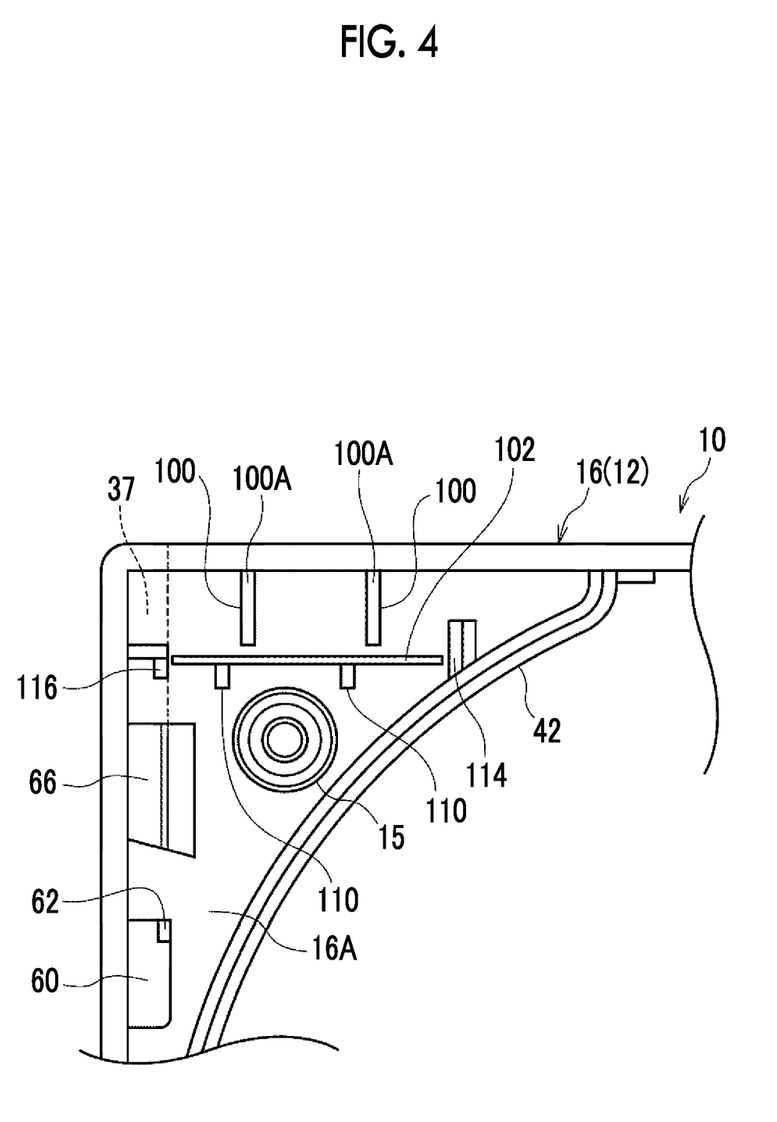
FIG. 4 is an enlarged plan view showing a portion of a lower case of the recording tape cartridge according to the present embodiment.

Further, as shown in FIG. 4, the groove portion 102 is formed away from a position right above the reference surface 37. In addition, as shown in FIG. 8, the bottom surface 106 of the groove portion 102 that faces the lower surface 126D of the lower end portion 126 of the cartridge memory 120 in the vertical direction (axial direction of reel 20) is a planar portion 106A extending along the lower surface of the bottom plate 16A. Note that, a length W2 (refer to FIG. 9) of the bottom surface 106 (planar portion 106A) of the groove portion 102 in the front-rear direction is about 0.5 mm.

Furthermore, as shown in FIGS. 4 to 8, two (one pair of) ribs 110 that extend upward from an upper edge portion 104U (edge portion of groove portion 102 that is on upper surface 120U side of cartridge memory 120) of the inclined surface 104 are integrally provided with the bottom plate 16A at a position ahead of the supporting ribs 100 such that the ribs 110 protrude at a predetermined interval in the lateral direction. Note that, a length W3 (refer to FIG. 7) of a base portion of each rib 110 in the front-rear direction is about 2.2 mm.

In addition, each rib 110 includes an overlapping portion 112 that projects to a position above the cartridge memory 120. That is, a rear end portion 110B of the rib 110 is inclined rearward with respect to a direction perpendicular to the bottom plate 16A such that an upper end portion is positioned a predetermined length W4 behind a lower end portion (for example, W4=about 0.5 mm (refer to FIG. 7)) as seen in a side view and the upper end portion is the overlapping portion 112.

Figure 9:
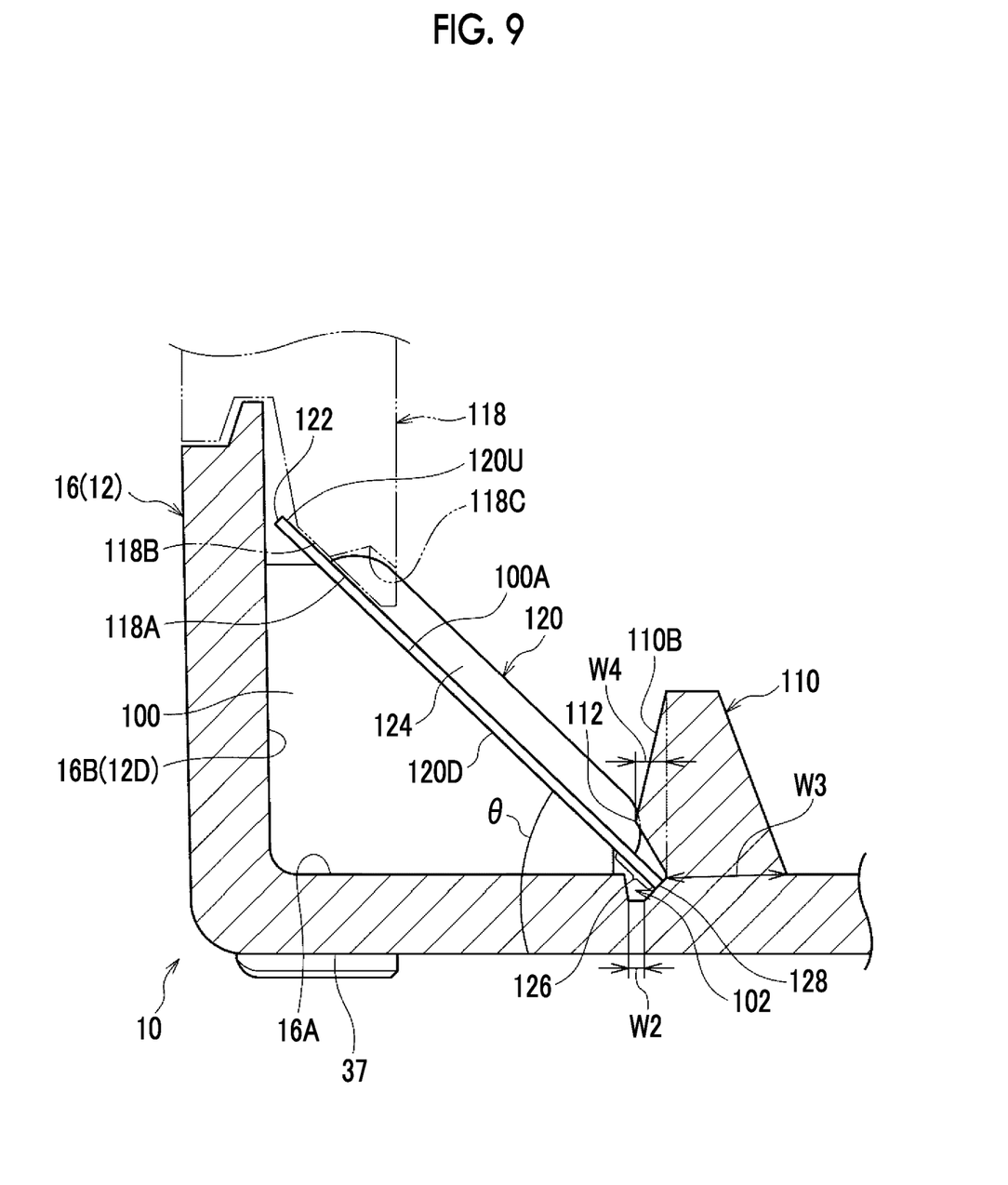
FIG. 9 is a sectional view corresponding to FIG. 7 showing a modification example of the recording tape cartridge according to the present embodiment.

Note that, the overlapping portion 112 formed on the rib 110 may have a shape as shown in FIG. 9. That is, a lower intermediate portion of the rear end portion 110B of the rib 110 may protrude rearward forming an obtuse angle with respect to the direction perpendicular to the bottom plate 16A such that the lower intermediate portion is positioned the predetermined length W4 behind the lower end portion (for example, W4=about 0.5 mm) as seen in the side view and the protruding lower intermediate portion may be the overlapping portion 112.

In addition, as shown in FIGS. 4 to 6, a position restricting rib 114 as a position restricting portion that positionally restricts a left end portion 120L of the cartridge memory 120 (epoxy substrate 122) is integrally provided with the bottom plate 16A while protruding at a position to the left of the supporting ribs 100. Furthermore, a position restricting rib 116 as a position restricting portion that positionally restricts a right end portion 120R of the cartridge memory 120 (epoxy substrate 122) is integrally provided with the bottom plate 16A while protruding at a position to the right of the supporting ribs 100.

As a result, the position of the cartridge memory 120 is restricted in the front-rear direction and the lateral direction. In addition, as shown in FIGS. 3 and 7, two (one pair of) holding ribs 118 as position restricting portions that positionally restrict the cartridge memory 120 from above are integrally provided with the inner surface of the top plate 14A of the upper case 14 behind the screw boss 15 on the right rear side such that the holding ribs 118 protrude at a predetermined interval in the lateral direction.

One (right) holding rib 118R is formed in an approximately trapezoidal shape as seen in a side view and a lower end surface 118A thereof is obliquely cut out in accordance with the predetermined angle θ of the supporting ribs 100. In addition, on a lower end surface 118B of the other (left) holding rib 118L, a notch portion 118C (refer to FIG. 7) is formed away from the swollen portion 124 (to match shape of swollen portion 124).

Therefore, in a case where the lower case 16 and the upper case 14 are bonded to each other, the lower end surface 118A of the holding rib 118R and the lower end surface 118B of the holding rib 118L face the upper surface 120U and the swollen portion 124 of the cartridge memory 120 respectively with a slight gap interposed therebetween or come into contact with the upper surface 120U and the swollen portion 124 lightly and thus the cartridge memory 120 is positionally restricted toward the supporting ribs 100.

As a result, regardless of the posture of the recording tape cartridge 10 (case 12), the cartridge memory 120 is held without being displaced from a position above the supporting surfaces 100A and is stably disposed while being inclined at the predetermined angle θ.

Next, the operation of the recording tape cartridge 10 according to the present embodiment configured as described above will be described.

The recording tape cartridge 10 is loaded into the drive device with a front wall 12A being at the front. Then, the door 50 slides such that the opening 18 is opened and the positioning members (not shown) provided in the drive device are relatively inserted into the reference hole 32 and the reference hole 34, respectively. In addition, the positioning surfaces (not shown) provided in the drive device relatively abut the reference surface 33, the reference surface 35, the reference surface 37, and the reference surface 39, respectively. As a result, the recording tape cartridge 10 (case 12) is positioned in the front-rear direction, the lateral direction, and the thickness direction (height direction) in the drive device.

In addition, the rotary shaft (not shown) provided in the drive device relatively enters the case through the gear opening 40 and thus the drive gear (not shown) meshes with the reel gear 44. Then, as the drive gear meshes with the reel gear 44, the leg portions 94 protruding over the reel gear 44 are pushed up against the urging force of the compression coil spring 98 and the braking member 80 is pushed upward via the releasing member 90 such that the braking gear 84 and the engaging gear 48 meshing with each other are released from each other.

Then, in a state where the drive gear and the reel gear 44 completely mesh with each other, the reel plate 46 is adsorbed and held by the magnetic force of an annular magnet provided inside the drive gear. Accordingly, the reel 20 enters an unlocked state where a mesh between the reel gear 44 and the drive gear is maintained and the reel 20 can rotate relative to the case 12 in the case 12.

In addition, the noncontact reading and writing device provided in the drive device accesses the IC chip of the cartridge memory 120 from below in a noncontact manner. That is, a magnetic field is emitted from the noncontact reading and writing device and the antenna of the cartridge memory 120 receives the magnetic field. Therefore, an electromotive force is generated and the noncontact reading and writing device reads individual information recorded on the IC chip or writes individual information on the IC chip.

Here, the cartridge memory 120 is disposed while being accurately inclined with respect to the reference surfaces 33, 35, 37, and 39 at the predetermined angle θ (θ=approximately 45 degrees) by means of the supporting ribs 100, the groove portion 102, the ribs 110, and the position restricting ribs 114 and 116 provided on the lower case 16 and the holding ribs 118 provided on the upper case 14. In other words, the cartridge memory 120 is stably held at the angle θ without being displaced from the position above the supporting surfaces 100A.

In addition, since the portion 126A of the lower end portion 126 of the cartridge memory 120 is accommodated into the groove portion 102, the cartridge memory 120 is disposed while being lowered by the predetermined depth. Therefore, in comparison with a case where the lower end portion 126 of the cartridge memory 120 is supported by the inner surface of the bottom plate 16A, the cartridge memory 120 can be brought closer to the noncontact reading and writing device and the communication distance thereof can be shortened.

Therefore, even in the case of the cartridge memory 120 comprising an IC chip with a low manufacturing cost and a high capacity but a short communication distance, the antenna can receive more magnetic field emitted from the noncontact reading and writing device (can generate more electromotive force).

That is, it is possible to improve the communication performance with respect to the cartridge memory 120 without changing the size of the cartridge memory 120 (size of antenna formed on lower surface of epoxy substrate 122), and it is possible to read or write individual information by means of the noncontact reading and writing device with high accuracy. As described above, according to the present embodiment, even in the case of the cartridge memory 120 of which the communication distance is short, it is possible to secure the communication performance thereof.

In addition, in the case of a configuration in which the lower surface 126D of the lower end portion 126 of the cartridge memory 120 comes into contact with the upper edge portion 108U of the bottom plate 16A of the lower case 16, the cartridge memory 120 may be distorted by being caught on the upper edge portion 108U in a case where the portion 126A of the lower end portion 126 of the cartridge memory 120 is inserted into the groove portion 102 by means of a robot hand or the like and thus it may be difficult to stably mount the cartridge memory 120.

However, according to the present embodiment, the lower surface 126D (virtual extension line K2) of the lower end portion 126 of the cartridge memory 120 does not come into contact with the upper edge portion 108U of the bottom plate 16A of the lower case 16 (is disposed away from upper edge portion 108U while being disposed above upper edge portion 108U). Therefore, there is no possibility that the cartridge memory 120 is distorted by being caught on the upper edge portion 108U and thus it is possible to stably mount the cartridge memory 120 by means of the robot hand or the like.

Note that, it is preferable that the thickness D2 between the lower surface of the bottom plate 16A and the bottom surface 106 of the groove portion 102 is at least 1.1 mm (1.1 mm or more). In this case, it is possible to restrain or prevent the groove portion 102 from being reflected in the lower surface of the bottom plate 16A (groove portion 102 from being seen through lower surface of bottom plate 16A).

In addition, the bottom surface 106 of the groove portion 102 is the planar portion 106A extending along the lower surface of the bottom plate 16A. Therefore, it is possible to prevent a hole from being formed in the lower surface of the bottom plate 16A right below the groove portion 102 due to the resin material not flowing properly in a case where the lower case 16 is molded. In addition, since the groove portion 102 is formed away from a position right above the reference surface 37, it is possible to prevent a decrease in processing accuracy with respect to the reference surface 37.

In addition, the groove portion 102 includes the inclined surface 104 which the lower end surface 128 of the cartridge memory 120 abuts. Therefore, for example, it is possible to stabilize the posture of the cartridge memory 120 in comparison with a configuration in which the cartridge memory 120 is disposed with an upper edge portion and a lower edge portion of the lower end surface 128 abutting a side surface and a bottom surface forming a perpendicular corner portion as seen in a side view (such that gap is formed between lower end surface 128 and corner portion).

In addition, the overlapping portions 112 are formed on the ribs 110. Therefore, for example, in a case where the recording tape cartridge 10 is manufactured, positional displacement of the cartridge memory 120 having a light weight can be suppressed or prevented by the overlapping portion 112 even in a case where the lower case 16 with the cartridge memory 120 disposed thereon is transported (even in case where vibration is applied to lower case 16 before lower case 16 is covered with upper case 14).

In addition, even in a case where the recording tape cartridge 10 is loaded into the drive device, it is possible to make it difficult for the cartridge memory 120, of which the portion 126A of the lower end portion 126 is accommodated in the groove portion 102, to be displaced upward by means of the overlapping portions 112. Therefore, it is possible to suppress or prevent a decrease in communication performance with respect to the noncontact reading and writing device.

In addition, in a case where a portion of a mold at which the bottom plate 16A of the lower case 16 is molded is worn, the bottom plate 16A of the lower case 16 becomes thick and thus the position of the cartridge memory 120 is changed in a direction away from the noncontact reading and writing device. That is, there may be a decrease in communication performance of the cartridge memory 120 due to the wear of the mold. In addition, in a case where the thickness of the bottom plate 16A of the lower case 16 is made small in order to prevent a decrease in communication performance of the cartridge memory 120, the strength of the lower case 16 is lowered.

However, in the present embodiment, the groove portion 102 is formed in the bottom plate 16A of the lower case 16, and the groove portion 102 accommodates the portion 126A of the lower end portion 126 of the cartridge memory 120. Therefore, even in a case where a portion of a mold at which the bottom plate 16A of the lower case 16 is molded is worn, it is possible to suppress or prevent a change of the position of the cartridge memory 120 in a direction away from the noncontact reading and writing device.

In addition, since it is not necessary to reduce the thickness of the bottom plate 16A of the lower case 16 except for the groove portion 102, it is possible to suppress or prevent a decrease in strength of the lower case 16 and to prevent a decrease in productivity of the lower case 16 (quality abnormality caused by decrease in strength of lower case 16). As described above, according to the present embodiment, it is possible to prevent a decrease in communication performance caused by wear of a mold and a decrease in productivity at the same time.

In a case where data is to be recorded on the recording tape T or data in the recording tape T is to be reproduced, the pull-out member provided in the drive device enters the case 12 through the opening 18 in an opened state and the leader pin 30 positioned and held by the pin holding portions 36 is gripped and pulled out by the pull-out member. At this time, the reel 20 can rotate as the leader pin 30 is pulled out since the reel 20 is not in the rotation-locked state.

The leader pin 30 extracted through the opening 18 is accommodated in a take-up reel (not shown) provided in the drive device. Then, as the take-up reel and the reel 20 are rotationally driven in synchronization with each other, the recording tape T is sequentially drawn out from the case 12 while being wound on the take-up reel and data is recorded or reproduced by a recording and reproducing head (not shown) provided along a predetermined tape path. Then, use history, an index of data, and the like are recorded in the cartridge memory 120.

Hereinabove, the recording tape cartridge 10 according to the present embodiment has been described based on the drawings. However, the recording tape cartridge 10 according to the present embodiment is not limited to the recording tape cartridge shown in the drawings and the design thereof can be appropriately changed without departing from the gist of the present disclosure. For example, the cartridge memory 120 is not limited to a microcomputer type.

In addition, regarding the cartridge memory 120, a reading and writing operation may not be performed by the noncontact reading and writing device provided in the drive device. In a manufacturing line where the recording tape cartridge 10 is manufactured as well, a reading and writing operation is performed on the cartridge memory 120 by a noncontact reading and writing device provided in the manufacturing line. That is, production history or the like is recorded on the cartridge memory 120 at this time.

In addition, the shape of the groove portion 102 is not limited to an approximately trapezoidal shape as shown in the drawings. The shape of the groove portion 102 may be an approximately semicircular arc shape and may be an approximately triangular shape where the rear edge portion 106B and the upper edge portion 104U are connected by a straight line.

In addition, the two ribs 110 and the two holding ribs 118 are provided. However, the disclosure is not limited thereto and one or three or more ribs 110 may be provided and one or three or more holding rib 118 may be provided. In addition, the door 50 is not limited to a flat plate-shaped door of which the trajectory is linear as seen in a plan view and may be an approximately arc-shaped door of which the trajectory has an approximately arc shape as seen in the plan view, for example.

What is claimed is:

1. A recording tape cartridge comprising:
a case that accommodates a reel on which a recording tape is wound and includes a reference surface that serves as a reference in an axial direction of the reel in a case where the case is loaded into a drive device;
a noncontact communication medium on which individual information is recorded, the noncontact communication medium being accommodated in the case and having a plate shape;
a supporting portion that is formed in the case and supports one surface of the noncontact communication medium except for a lower end portion such that the noncontact communication medium is disposed while being inclined with respect to the reference surface at an angle of approximately 45 degrees; and
a groove portion that is formed in the case and accommodates a portion of the lower end portion of the noncontact communication medium,
wherein the one surface of the lower end portion of the noncontact communication medium is not in contact with the case.

2. The recording tape cartridge according to claim 1,
wherein the reference surface and the groove portion are formed on a bottom plate of the case, and
the groove portion is formed away from a position right above the reference surface.

3. The recording tape cartridge according to claim 1,
wherein a bottom surface of the groove portion that faces the one surface of the lower end portion of the noncontact communication medium in the axial direction of the reel is a planar portion extending along a lower surface of a bottom plate of the case.

4. The recording tape cartridge according to claim 1,
wherein the groove portion includes an inclined surface that a lower end surface of the noncontact communication medium abuts.

5. The recording tape cartridge according to claim 1, further comprising:
a rib that is formed in the case and extends upward from an edge portion of the groove portion that is on the other surface side of the noncontact communication medium,
wherein the rib includes an overlapping portion that projects to a position above the noncontact communication medium.

* * * * *